Aug. 27, 1963 H. RINIA ET AL 3,101,596

COLD-GAS REFRIGERATOR

Filed June 8, 1961 4 Sheets-Sheet 1

INVENTOR
HERRE RINIA.
ROELF J. MEIJER.
BY
AGENT

INVENTOR
HERRE RINIA.
ROELF J.MEIJER.
BY
AGENT

INVENTOR
HERRE RINIA.
ROELF J. MEIJER.
BY Frank R. Jifani
AGENT

INVENTOR
HERRE RINIA.
ROELF J. MEIJER.
BY
AGENT 3,101,596

COLD-GAS REFRIGERATOR

Herre Rinia and Roelf Jan Meijer, Eindhoven, Netherlands, assignors to North American Philips Company, Inc., New York, N.Y., a corporation of Delaware Filed June 8, 1961, Ser. No. 115,706
Claims priority, application Netherlands June 27, 1960
7 Claims. (Cl. 62—6)

This invention relates to cold-gas refrigerators comprising a chamber of variable volume (cold chamber or expansion chamber), which communicates with a chamber which likewise has a variable volume and in which the mean operating temperature is higher than that in the first-mentioned chamber (warmer chamber or compression chamber), a regenerator being provided in the connection between the two chambers and a gaseous working medium being capable of flowing forwards and backwards between the chambers via the regenerator, in order to transport heat from a lower temperature level to a higher temperature level.

In such a cold-gas refrigerator a gas, which preferably has a constant chemical composition, such as hydrogen or helium or a mixture thereof, performs a thermodynamic cycle, for example a cycle according to the Stirling process or the so-called Ericson process. The pressure in the cold chamber, sometimes referred to as expansion chamber, and the pressure in the warmer chamber, sometimes referred to as compression chamber, varies in the Stirling cycle in a sinusoidal way. The lowest temperature occurs at the lowest pressure in the cold chamber.

The outer wall of the cold chamber becomes very cold during operation. However, the wall does not become as cold as the gas in the chamber because of the temperature difference between the gas in the expansion chamber and the wall.

An object of the invention is to extract the cold output from such a machine in a different manner from what has been common practice hitherto.

According to the invention, the cold chamber communicates through a duct leading through the wall of this chamber to the exterior with an area located at a certain distance from this chamber, in a manner such that a portion of the gas in the cold chamber may be led through this duct to the exterior, in order to extract heat from the remote area.

A very important advantage of this structure is that the cold produced may be derived at a distance from the machine. The duct, which may briefly be referred to as "extraction duct," may be flexible and lead to a heat-exchanger which can form a very cold area which is not bound to the place of the machine. Even a plurality of cold areas located at a certain distance from one another are possible with a single cold-gas refrigerator.

The so-called freezer which is normally provided between the regenerator and the cold expansion chamber in such a cold-gas refrigerator may be fully omitted, if desired, when use is made of the invention.

Several embodiments of the principle of the invention are possible.

In a first embodiment, the duct leads via the remote cold area back to the cold chamber of the machine and near the two openings of the duct in the cold chamber there are provided valves in the duct which can open in opposite directions.

In another embodiment of the invention, the duct leads via the remote area back to the cold chamber of the machine and a valve, which is opened or closed towards the cold chamber, is provided near one opening of the duct, the duct near the other opening being formed, at least in part, by a capillary.

In a very important embodiment of the invention, the duct leads back to an area in the machine where temperatures prevail higher than those in the cold chamber, such as the warmer chamber (compression chamber), the cooler, an area in the regenerator, or a freezer provided between the regenerator and the cold chamber.

In this structure the regenerator may be brought out of balance wholly or in part, that is to say the mass of the gaseous working medium flowing from "hot to cold" is caused to be always a little greater than that flowing from "cold to hot." In this case, an amount of gas supplied through the extraction duct may be caused to flow through the regenerator always in the same direction from a warmer chamber to the cold chamber. This amount of gas delivers the cold output so that the freezer is not necessary.

The regeneration loss in the regenerator is considerably decreased by this intentional unbalance of the regenerator.

Preferably, the outlet from the cold chamber to the duct is formed so that gas is let out of this chamber at a moment when the temperature in this chamber is lowest. This has the advantage that, by means of the invention, cold can be delivered at a lower temperature than was possible hitherto, or if the temperatures of delivery are the same as in known machines, that a higher temperature can prevail in the cold chamber, which means that a higher output of the machine is obtainable not only as the result of the decrease in regeneration losses, but also due to the possibility of this higher temperature.

For letting gas out of the cold chamber, a valve loaded by an adjustable spring may be provided which can open towards the cold chamber.

In this connection it is to be noted that in machines in which a Stirling cycle is performed, due to the resistance to flow, the minimum pressure in the cold chamber (expansion chamber) is higher than the minimum pressure in the warmer chamber (compression chamber), so that extraction can actually be effected at approximately the lowest temperature in the cold chamber.

The invention also makes possible a particular structure of a cold-gas refrigerator without a freezer. In this structure the regenerator is incorporated in a reciprocating displacer, at one end of which is the cold chamber and at the other end of which is a warmer chamber which communicates via a stationary cooler with another warmer chamber (compression chamber), which adjoins a piston adapted to reciprocate in a cylinder.

This is an embodiment which is sometimes briefly referred to as a "three-chamber machine."

In order that the invention may be readily carried into effect, it will now be described in detail, by way of example, with reference to the accompanying diagrammatic drawings, in which.

Figure 1:
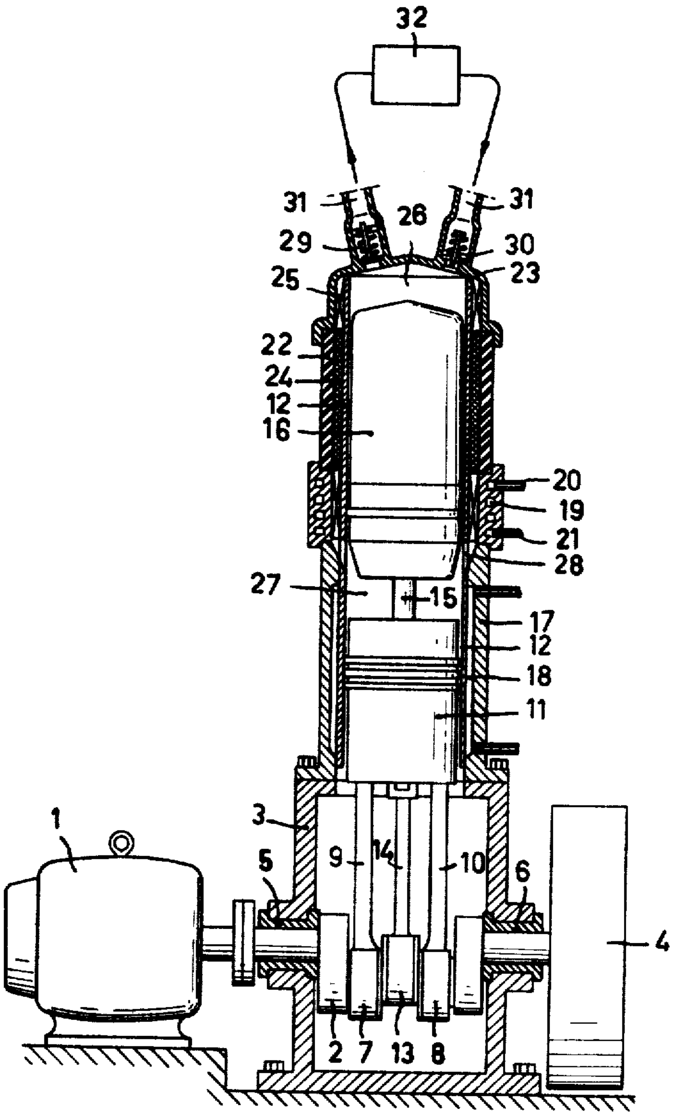
FIGURE 1 shows a longitudinal section of a first embodiment of a cold-gas refrigerator according to the invention.

Referring now to FIGURE 1, a motor, for example an electric motor 1, drives a crank shaft 2 which is journalled by means of bearings 5 and 6 in a housing 3 and which carries a flywheel 4. The crank shaft 2 has two identical cranks 7 and 8 which drive via driving rods 9 and 10 a piston 11, which is guided in a cylinder liner 12. The crank shaft 2 also carries a crank 13 which drives through a driving rod 14 and a piston rod 15 guided by the piston 11, a displacer 16 which is also guided in the cylinder liner 12.

The liner 12 is provided in a cylindrical housing 17 which, together with the liner 12, constitutes a cooling envelope 18.

Provided on the housing 17 is a cooler 19 which has a cooling medium, for example water or a liquid gas, supplied to it and discharged from it by means of connections 20 and 21.

An envelope 22, closed at the top by a cover 23, adjoins the cooler 19.

A regenerator 24 consisting, for example, of thin gauzes or a mass of thin metal wire, is arranged between the envelope 22 and the liner 12. A freezer 25 formed, for example, by ribs is provided between the cover 23 and the liner 12.

A cold chamber 26, sometimes referred to as expansion chamber, is provided between the head of the displacer 16 and the cover 23. A warmer chamber 27, sometimes referred to as compression chamber, is present between the lower end of the displacer 16 and the head of the piston 11.

The cranks 7, 8 and 13 are positioned so that the piston 11 and the displacer 16 are reciprocated with a phase difference.

A gaseous medium, such as hydrogen or helium, is compressed in the chamber 27. The medium flows through gates 28 along the cooler 19, through the regenerator 24 and along the freezer 25 to the chamber 26, wherein the gas expands and flows via the freezer, the regenerator and the cooler back to the chamber 27.

Figure 4:
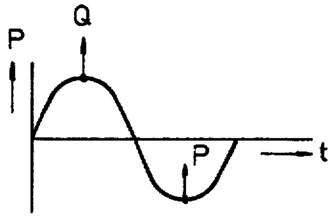
FIGURES 4 and 5 illustrate the variation of the pressure wave in the cold chamber (expansion chamber)
Figure 5:
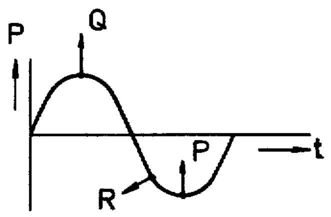
Figure 8:
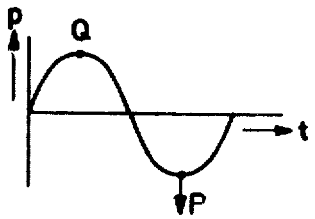
FIGURE 8 illustrates the variation in pressure in the cold chamber of the machine of FIGURE 6.

A pressure wave occurs during this cycle in the cold chamber 26 (see FIGURES 4, 5 and 8). A similar pressure wave occurs in the hot chamber 27.

The pressure is lowest and the temperature of the expanded gas is lowest at point P of the wave shown in FIGURES 4, 5 and 8. The pressure is highest at point Q of the wave shown in FIGURES 4, 5 and 8.

In FIGURE 1, the cover 23 is provided with two valves 29 and 30. The valve 29 opens to the exterior and the valve 30 opens towards the cold chamber 26.

The valves 29 and 30 are provided in a duct 31 which leads along an area 32 from which cold can be extracted, for example a heat-exchanger. The area 32 may be situated at a certain distance from the cold-gas refrigerator. As a matter of fact, the duct 31 must be satisfactorily insulated.

The valve 29 may be loaded and adjusted so as to open at the pressure shown at point Q of FIGURE 4, whereas the valve 30 is adjusted so as to open at the pressure shown at point P of FIGURE 4.

If it is desired to extract the cold as much as possible near the lowest temperature in the chamber 26, it is also conceivable to open the valve 29 at point R (FIGURE 5) and to open the valve 30 at point P. The valves may alternatively be driven, if desired.

Figure 2:
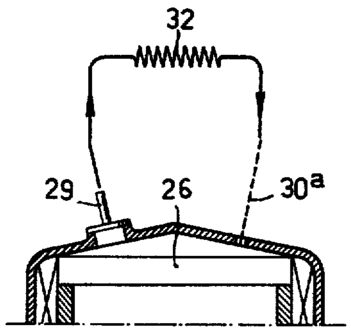
FIGURES 2 and 3 show details, namely cylinder heads of a cold-gas refrigerator of other structures.
Figure 3:
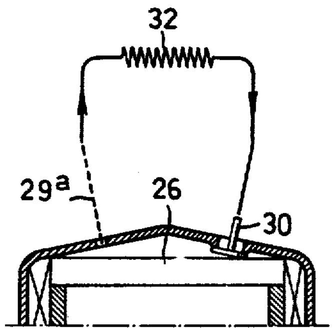

FIGURES 2 and 3 show the case where one of the valves 30 and 29 is replaced by capillary portions 30*a* and 29*a* respectively of the duct 31.

In FIGURE 2, the capillary portion 30*a* may be calculated on the pressure at Q (FIGURE 4), being the maximum pressure, if gas is desired to be let out of the chamber 26 at the maximum pressure Q (FIGURE 4).

In FIGURE 3, the capillary portion 29*a* may be calculated on the minimum pressure, if the valve 30 is desired to be opened at the minimum pressure.

The freezer 25 may alternatively be omitted in the structure shown in FIGURE 1.

Figure 6:
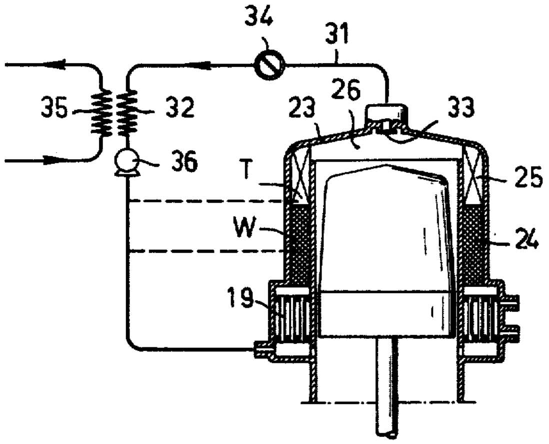
FIGURE 6 is a diagrammatic illustration of a very important other embodiment of the invention.

A construction, which is even more advantageous, is shown in FIGURE 6.

In this structure, the cover 23 has only one valve 33, which is shown in detail in FIGURE 6. The valve 33 opens inwardly, preferably when the pressure in the expansion chamber 26 is a minimum (point P of FIGURE 8). Gas of the lowest temperature is then let out into the duct 31. If desired, this gas is allowed to expand further by means of a choke cock 34 so that a very low temperature is obtained due to the Joule-Kelvin effect.

The cold gas which flows through the heat-exchanger 32 in counter-flow with the medium to be cooled in a duct 35 is thus heated to the temperature of the cooler 19 and led through the cooler to the regenerator 24. The gas thus re-enters the circuit. When using the choke cock 34, the gas is compressed by means of a compressor 36 before being supplied back into the cycle.

The regenerator 24, or a portion thereof, is now in an unbalanced state, which affords the advantages above described.

It is possible for the gas from the duct 31, after the heat-exchanger 32, to be led into the regenerator at an area other than its lower end, for example at W. It is also possible to lead the gas back into the freezer 25, for example at T.

In a practical construction, a portion of the total gas flow, approximately equal to $$\frac{1}{r}$$

is tapped by the valve 33 and passed through the duct 31. Herein $r$ indicates the relative regenerator load, that is the quotient of the stored heat in the regenerator per half period of the cycle and the cold output.

Figure 9:
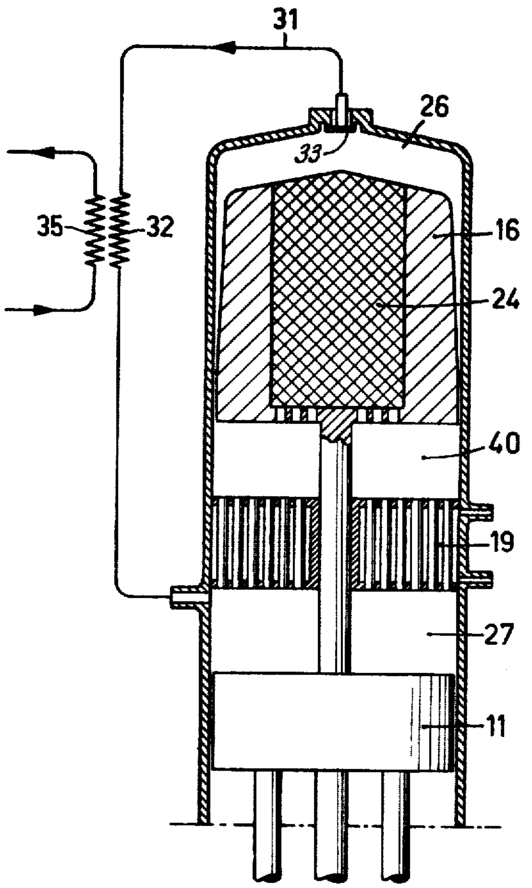
FIGURE 9 shows a diagram of a so-called three-chamber machine which is made possible by the invention.

FIGURE 9 shows a cold-gas refrigerator without a freezer. The regenerator 24 is provided inside the displacer 16. An intermediate space 40 is present between the displacer 16 and the stationary cooler 19. The cooler 19 communicates with the compression chamber 27 which adjoins the piston 11. Three chambers 27, 40 and 26 are thus available.

Figure 7:
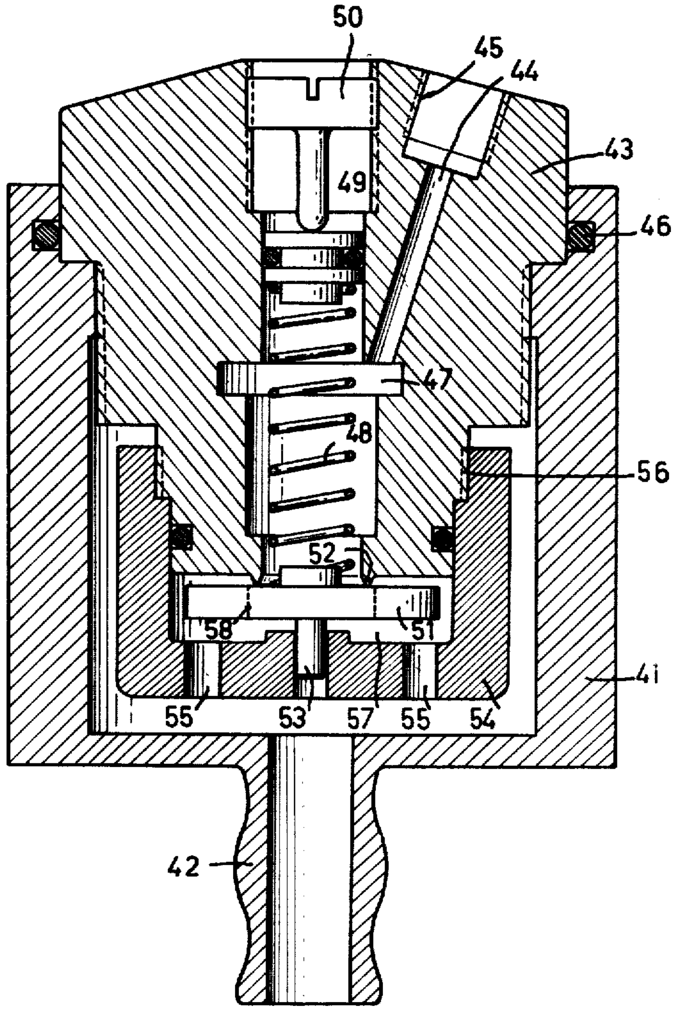
FIGURE 7 shows a longitudinal section of one embodiment of a tapping valve for the cold chamber.

FIGURE 7 shows a possible structure of the valve 33 in longitudinal section.

A housing 41 is connected to the cover 23 by means of a junction stump 42.

Screwed into the housing 41 is a plug 43 having a bore 44 to which the duct 31 may be connected at 45. The threaded plug 43 is sealed by means of an O-ring 46. The bore 44 empties into a chamber 47 in which a screw spring 48 is arranged between an adjusting piston 49, which co-acts with an adjusting plug 50, and a valve body 51 which can shut off on a seat 52 formed on the plug 43. The body 51 is guided by means of a pin 53 in a head 54 which is screwed on the plug 43 and 56 and is provided with bores 55 which communicate the cold chamber 26 of the machine through the stump 42 with a chamber 57 around the valve body 51.

The valve 51 is opened by the spring 48 when the pressure in the chamber 26 has dropped to a pre-determined value, for example to P in FIGURE 8. Gas with a high pressure then flows round the body 51 and along the seat 52. Due to the narrowing of the passage, it is then possible according to the Bernouilli law to obtain a decrease in pressure which tends to pull the valve 51 against its seat 52, thus facilitating closure of the valve.

The valve body 51 may alternatively have a smaller diameter, as indicated in dotted lines at 58.

What is clamed is:

1. A cold-gas refrigerator having a gaseous working medium therein performing a closed thermodynamic cycle comprising a cold expansion chamber of variable volume and a warmer compression chamber of variable volume, a regenerator communicating with said chambers wherein said gaseous working medium flows cyclically through said chambers and regenerator, a duct leading through the wall of said cold chamber to the exterior thereof, a heat exchanger for extracted cold located a predetermined distance from said cold chamber, said duct connecting to said heat exchanger whereby cold from said cold chamber is supplied to said heat exchanger, and another duct connecting said heat exchanger with said warmer compression chamber of the refrigerator, and means for preventing the gas flow from said cold compression chamber to said warmer expansion chamber through said heat exchanger.

2. A cold-gas refrigerator having a gaseous working medium therein performing a closed thermodynamic cycle comprising a cold expansion chamber of variable volume and a warmer compression chamber of variable volume, a regenerator communicating with said chambers wherein said gaseous working medium flows cyclically through said chambers and regenerator, a duct leading through the wall of said cold chamber to the exterior thereof, a heat exchanger for extracted cold located a predetermined distance from said cold chamber, said duct connecting to said heat exchanger whereby cold from said cold chamber is supplied to said heat exchanger and, another duct connecting said enclosure with said regenerator, and means for preventing the gas flow from said cold compression chamber to said warmer expansion chamber through said heat exchanger.

3. A cold-gas refrigerator having a gaseous working medium therein performing a closed thermodynamic cycle as claimed in claim 1 wherein said means comprises a valve in the cold chamber located adjacent to one opening of the duct, and at least a portion of said duct being formed as a capillary near the other opening of the duct.

4. A cold-gas refrigerator having a gaseous working medium therein performing a closed thermodynamic cycle as claimed in claim 1 and comprising a cylinder with a piston and displacer reciprocating therein in an out-of-phase relationship and wherein the outlet from said cold chamber to said duct is constructed so that the gaseous medium is let out of the cold chamber when said displacer is at its lowest position.

5. A cold-gas refrigerator having a gaseous working medium therein performing a closed thermodynamic cycle comprising a cold expansion chamber of variable volume and a warmer compression chamber of variable volume, a regenerator communicating with said chambers wherein said gaseous working medium flows cyclically through said chambers and regenerator, a duct leading through the wall of said cold chamber to the exterior thereof, a heat exchanger for extracted cold located a predetermined distance from said cold chamber, said duct connecting to said heat exchanger whereby cold from said cold chamber is supplied to said heat exchanger, and another duct connecting said enclosure with said warmer compression chamber of the refrigerator, a valve in said cold chamber having an adjustable spring for biasing the same into its closed position, said valve being adapted to be opened to permit removal of some of the gaseous working medium in said cold chamber through said valve to said duct.

6. A cold-gas refrigerator having a gaseous working medium therein performing a closed thermodynamic cycle comprising a cold expansion chamber of variable volume and a first warmer compression chamber of variable volume, a stationary cooler, a second warmer compression chamber, said first warmer chamber communicating with said second warmer chamber through said stationary cooler, a regenerator communicating with said chambers wherein said gaseous working medium flows cyclically through said chambers and regenerator, a duct leading through the wall of said cold chamber to the exterior thereof, a heat exchanger for extracted cold located a predetermined distance from said cold chamber, said duct connecting to said heat exchanger whereby cold from said cold chamber is supplied to said heat exchanger and another duct connecting said enclosure with said warmer compression chamber of the refrigerator, and means for preventing the gas flow from said cold compression chamber to said warmer expansion chamber through said heat exchanger.

7. A cold-gas refrigerator having a gaseous working medium therein performing a closed thermodynamic cycle comprising a cold expansion chamber of variable volume and a warmer compression chamber of variable volume, a regenerator communicating with said chambers wherein said gaseous working medium flows cyclically through said chambers and regenerator, a first duct leading through the wall of said cold chamber to the exterior thereof, a heat exchanger for extracted cold located a predetermined distance from said cold chamber, said first duct connecting to said heat exchanger whereby cold from said cold chamber is supplied to said heat exchanger, and second duct connecting said heat exchanger with said warmer compression chamber of the refrigerator, a third duct containing the gaseous medium to be cooled said cold gas in said first duct flowing through said heat exchanger in a counterflow to said gaseous medium to be cooled, and means for preventing the gas flow from said cold compression chamber to said warmer expansion chamber through said heat exchanger.

References Cited in the file of this patent

UNITED STATES PATENTS

| | | |
|---|---|---|
| 2,157,229 | Bush | May 9, 1939 |
| 2,750,765 | Kohler | June 19, 1956 |
| 2,836,964 | Roozendaal | June 3, 1958 |
| 2,963,871 | Meijer | Dec. 13, 1960 |

UNITED STATES PATENT OFFICE
CERTIFICATE OF CORRECTION

Patent No. 3,101,596 August 27, 1963

Herre Rinia et al.

It is hereby certified that error appears in the above numbered patent requiring correction and that the said Letters Patent should read as corrected below.

Column 5, line 50, for "enclosure" read -- heat exchanger --.

Signed and sealed this 5th day of May 1964.

(SEAL)
Attest:

ERNEST W. SWIDER
Attesting Officer

EDWARD J. BRENNER
Commissioner of Patents